(12) United States Patent
Lutter et al.

(10) Patent No.: US 7,594,555 B2
(45) Date of Patent: Sep. 29, 2009

(54) HOOD LIFT MECHANISM AND METHOD

(75) Inventors: Gerhard Lutter, Bergfelde (DE); Daniel Hahn, Berlin (DE); Minoo J. Shah, Farmington Hills, MI (US); James L. Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 562 days.

(21) Appl. No.: 11/265,541

(22) Filed: Nov. 2, 2005

(65) Prior Publication Data

US 2006/0131086 A1   Jun. 22, 2006

Related U.S. Application Data

(60) Provisional application No. 60/628,754, filed on Nov. 17, 2004.

(51) Int. Cl.
*B62D 25/10* (2006.01)
*B60K 28/10* (2006.01)

(52) U.S. Cl. ............... 180/69.21; 180/274; 180/89.17; 180/69.2; 280/763.1; 280/764.1; 296/187.04; 296/187.09

(58) Field of Classification Search ............. 280/763.1, 280/764.1; 180/89.17, 69.2, 69.21
See application file for complete search history.

(56) References Cited

U.S. PATENT DOCUMENTS

| | | | | |
|---|---|---|---|---|
| 4,249,632 A * | 2/1981 | Lucchini et al. | ............. | 180/274 |
| 4,382,312 A * | 5/1983 | Liggett et al. | ................. | 16/365 |
| 4,530,412 A * | 7/1985 | Sigety, Jr. | ................. | 180/69.21 |
| 5,197,560 A * | 3/1993 | Oda et al. | ................. | 180/69.21 |
| 5,339,494 A * | 8/1994 | Esau et al. | ..................... | 16/294 |
| 5,557,829 A * | 9/1996 | Schoen et al. | ................. | 16/375 |
| 5,697,467 A * | 12/1997 | Howard | ................... | 180/69.21 |
| 6,167,977 B1 * | 1/2001 | Adamson et al. | ........... | 180/69.2 |
| 6,182,782 B1 * | 2/2001 | Matsuura et al. | ............ | 180/274 |
| 6,217,108 B1 * | 4/2001 | Sasaki | ................... | 296/187.09 |

(Continued)

*Primary Examiner*—Christopher P Ellis
*Assistant Examiner*—Jacob Meyer
(74) *Attorney, Agent, or Firm*—Douglas D. Fekete (57) ABSTRACT

A method and apparatus for moving a portion of a vehicle hood away from a portion of the vehicle, the apparatus comprising: a first portion; a second portion, comprising; a fixed portion and a slidable portion slidably mounted to the first portion for movement between a first position and a second position, the fixed portion comprising a first opening at one end and an elongated opening, the slidable portion comprising a second opening juxtaposed to the first opening when the slidable portion is in the first position; a first connecting member being pivotally secured to the first portion at one end and releaseably secured to the second portion at another end by a pivot pin that is rotatably secured within the first opening and the second opening when the slidable portion is in the first position; a second connecting member being pivotally secured to the first portion at one end and slidably secured to the second portion at another end by a pin that is slidably received within the elongated opening of the fixed portion and an elongated opening of the slidable portion; and an actuation device for providing a force to move the slidable portion from the first position to the second position and thereafter move the pin of the second connecting member within the elongated openings of the fixed portion and the slidable portion to cause the second portion to move away from the first portion.

9 Claims, 11 Drawing Sheets

U.S. PATENT DOCUMENTS

| | | | |
|---|---|---|---|
| 6,257,657 B1 * | 7/2001 | Sasaki | 296/187.09 |
| 6,293,362 B1 * | 9/2001 | Sasaki et al. | 180/274 |
| 6,330,734 B1 * | 12/2001 | Cho | 16/376 |
| 6,345,679 B1 * | 2/2002 | Sasaki | 180/274 |
| 6,364,402 B1 * | 4/2002 | Sasaki | 296/187.09 |
| 6,415,882 B1 * | 7/2002 | Schuster et al. | 180/69.21 |
| 6,439,330 B1 * | 8/2002 | Paye | 180/69.21 |
| 6,442,801 B1 * | 9/2002 | Kim | 16/361 |
| 6,453,511 B2 * | 9/2002 | Sato | 16/360 |
| 6,513,617 B2 * | 2/2003 | Sasaki et al. | 180/274 |
| 6,520,276 B2 * | 2/2003 | Sasaki et al. | 180/274 |
| 6,530,449 B2 * | 3/2003 | Sasaki et al. | 180/274 |
| 6,543,086 B2 * | 4/2003 | Bjureblad et al. | 16/222 |
| 6,554,093 B2 * | 4/2003 | Sasaki et al. | 180/274 |
| 6,609,583 B2 * | 8/2003 | Schillaci et al. | 180/69.21 |
| 6,668,962 B2 * | 12/2003 | Son | 180/274 |
| 6,934,999 B2 * | 8/2005 | Kreth et al. | 16/222 |
| 6,942,056 B2 * | 9/2005 | Nadeau et al. | 180/274 |
| 6,953,220 B2 * | 10/2005 | Takehara | 296/187.04 |
| 6,964,316 B1 * | 11/2005 | Polz et al. | 180/274 |
| 7,000,720 B2 * | 2/2006 | Polz et al. | 180/69.21 |
| 7,073,846 B2 * | 7/2006 | Borg et al. | 296/187.13 |
| 7,077,225 B2 * | 7/2006 | Minami | 180/69.21 |
| 7,195,090 B2 * | 3/2007 | Parks et al. | 180/271 |
| 7,207,406 B1 * | 4/2007 | Polz et al. | 180/69.21 |
| 7,232,178 B2 * | 6/2007 | Neal et al. | 296/187.04 |
| 7,293,624 B2 * | 11/2007 | Adachi | 180/274 |
| 7,303,040 B2 * | 12/2007 | Green et al. | 180/274 |
| 7,334,656 B2 * | 2/2008 | Kramarczyk et al. | 180/274 |
| 7,475,752 B2 * | 1/2009 | Borg et al. | 180/274 |
| 7,506,716 B1 * | 3/2009 | Salmon et al. | 180/274 |
| 2002/0026685 A1 * | 3/2002 | Bjureblad et al. | 16/221 |
| 2002/0170759 A1 * | 11/2002 | Son | 180/69.21 |
| 2005/0257980 A1 * | 11/2005 | Green et al. | 180/274 |
| 2005/0285431 A1 * | 12/2005 | Rex et al. | 296/187.04 |
| 2006/0032693 A1 * | 2/2006 | Parks et al. | 180/271 |
| 2006/0213709 A1 * | 9/2006 | Yamaguchi et al. | 180/69.21 |
| 2008/0156556 A1 * | 7/2008 | Takahashi | 180/69.21 |
| 2008/0302591 A1 * | 12/2008 | Herzog et al. | 180/274 |
| 2009/0050388 A1 * | 2/2009 | Leong | 180/69.21 |

* cited by examiner

HOOD LIFT MECHANISM AND METHOD

CROSS REFERENCE TO RELEATED APPLICATIONS

This application claims the benefit of U.S. Provisional application 60/628,754 filed Nov. 17, 2004, the contents of which are incorporated herein by reference thereto.

TECHNICAL FIELD

This present invention relates generally to an apparatus and method for lifting a hood of a vehicle, more particularly the present invention is related to an apparatus and method for enabling the lifting of the hood in accordance with a predetermined activation event.

BACKGROUND

Vehicles are typically provided with a front hood positioned at the forward end of the vehicle. The front hood is generally pivotally mounted to the vehicle frame by a pair of hinges disposed at the rearward end of the hood. The hinges allow the hood to pivot about the point of securement so that access may be provided to the engine compartment disposed below the hood. In a forward or head on collision the hood and front end of the vehicle will make first contact with the pedestrian. In the unfortunate event of a head on collision between a vehicle and a pedestrian, the pedestrian may impact upon a portion of the hood.

Accordingly, it is desirable to provide a method and apparatus for use with and in anticipation of a collision with of a pedestrian with a portion of the hood.

SUMMARY

Disclosed herein is an apparatus and method for moving a portion of a vehicle hood away from a portion of the vehicle, the apparatus comprising at least one hinge for pivotally securing the hood to the vehicle, the hinge comprising: a base portion; a first member being either pivotally secured to the base portion or the hood at one end and releasably secured at its opposite end; a second member for moving the hood away from the vehicle when the first member has been released from either the hood or the base portion; and an activation device for providing a lifting force to the hood, wherein activation of the activation device releases the first member and provides a force for moving a portion of the hood away from the vehicle.

In one exemplary embodiment, a releasable hinge for securing a hood to a vehicle is provided. The releasable hinge comprising: a base portion; a first member pivotally secured to the base portion at one end and a pair of members at the other end, a first one of the pair of members being pivotally secured to the base portion and a second one of the pair of members being pivotally secured to the first member at one end and the other end of the second one of the pair of members is configured to be pivotally secured to the hood; and a release mechanism for releasably securing the first member and the pair of members to the base portion, wherein the first member and the first one of the pair of members are able to pivot from a first position to a second position with respect to the base portion and the second one of the pair of members is able to pivot with respect to the first member and the first one of the pair of members after the release mechanism has been activated.

In another exemplary embodiment, an activation system for a hood of a vehicle is provided. The activation system comprising: the activation system comprising: a pair of releasable hinges for pivotally securing the hood to the vehicle, each hinge of the pair of releasable hinges comprising: a base portion; a first member pivotally secured to the base portion at one end and a pair of members at the other end, a first one of the pair of members being pivotally secured to the base portion and a second one of the pair of members being pivotally secured to the first member at one end and the other end of the second one of the pair of members is configured to be pivotally secured to the hood; and a release mechanism for releasably securing the first member and the pair of members to the base portion, wherein the first member and the first one of the pair of members are able to pivot from a first position to a second position with respect to the base portion and the second one of the pair of members is able to pivot with respect to the first member and the first one of the pair of members after the release mechanism has been activated; and a lift mechanism for providing a lifting force to the hood, wherein activation of the lift mechanism moves a portion of the hood away from the vehicle when the release mechanism has been activated.

In another exemplary embodiment, a releasable hinge and lift mechanism for securing a hood to a vehicle is provided. The hinge and lift mechanism comprising: a first member, having a first opening for rotatably receiving a portion of a pivot member of the hood therein, a second member slidably secured to the first member for movement between a first position and a second position, the second member having a second opening, which is configured to secure the portion of the pivot member in the first opening of the first member, when the second member is in the first position; an actuation device configured for providing an activation force to an actuating member slidably mounted to the second member, wherein the activation force causes the second member to first move to the second position, wherein the portion of the pivot member of the hood is no longer retained by the releasable hinge and thereafter the activation force causes the actuating member to slide from a non-activated position toward an activated position, wherein an actuating pin of the actuating member makes contact with a cam surface of a lift lever pivotally secured to the releasable hinge, wherein the lift lever is pivoted away from the releasable hinge.

In another exemplary embodiment, a releasable hinge and lift mechanism for securing a hood to a vehicle is provided. The hinge and lift mechanism comprising: a first portion; a second portion, comprising a fixed portion and a slidable portion slidably mounted to the first portion for movement between a first position and a second position, the fixed portion comprising a first opening at one end and an elongated opening, the slidable portion comprising a second opening juxtaposed to the first opening when the slidable portion is in the first position; a first connecting member being pivotally secured to the first portion at one end and releaseably secured to the second portion at another end by a pivot pin that is rotatably secured within the first opening and the second opening when the slidable portion is in the first position; a second connecting member being pivotally secured to the first portion at one end and slidably secured to the second portion at another end by a pin that is slidably received within the elongated opening of the fixed portion and an elongated opening of the slidable portion; an actuation device for providing a force to move the slidable portion from the first position to the second position and thereafter move the pin of the second connecting member within the elongated openings of the fixed portion and the slidable portion to cause the second portion to move away from the first portion.

In addition, a method for releasing and moving a portion of a hood of a vehicle is also provided. The method, comprising: determining if a pedestrian is about to contact the portion of the hood; activating a releasable hinge and lift mechanism for releasing another portion of the hood from the releasable hinge; and providing a force to the hood in order to provide an unoccupied space between the hood and a portion of the vehicle, wherein the releasable hinge and lift mechanism comprises: a first portion; a second portion, comprising a fixed portion and a slidable portion slidably mounted to the first portion for movement between a first position and a second position, the fixed portion comprising a first opening at one end and an elongated opening, the slidable portion comprising a second opening juxtaposed to the first opening when the slidable portion is in the first position; a first connecting member being pivotally secured to the first portion at one end and releaseably secured to the second portion at another end by a pivot pin that is rotatably secured within the first opening and the second opening when the slidable portion is in the first position; a second connecting member being pivotally secured to the first portion at one end and slidably secured to the second portion at another end by a pin that is slidably received within the elongated opening of the fixed portion and an elongated opening of the slidable portion; and an actuation device for providing a force to move the slidable portion from the first position to the second position and thereafter move the pin of the second connecting member within the elongated openings of the fixed portion and the slidable portion to cause the second portion to move away from the first portion.

The above-described and other features of the present disclosure will be appreciated and understood by those skilled in the art from the following detailed description, drawings, and appended claims.

DRAWINGS

FIGS. 26-29B are perspective views of an alternative exemplary embodiment of the present invention.

DESCRIPTION OF EXEMPLARY EMBODIMENTS

Figure 1:
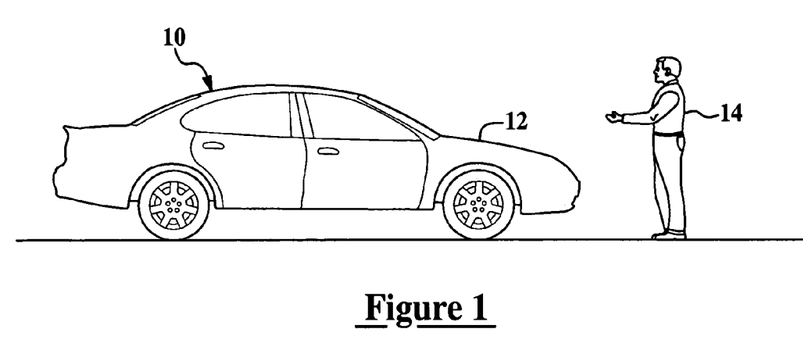
FIG. 1 is a view of a vehicle and a pedestrian illustrating the hood in a non-actuated position.
Figure 2:
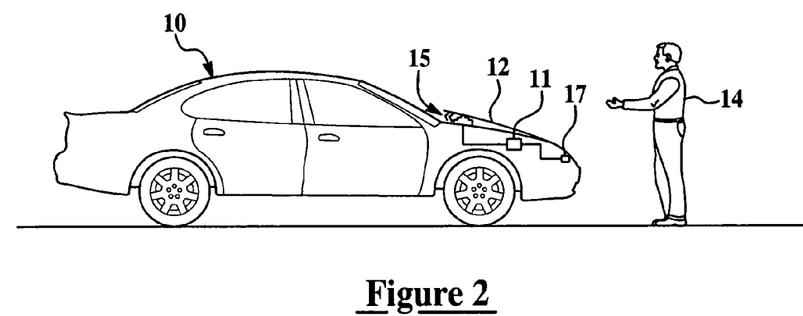
FIG. 2 is a view of a vehicle and a pedestrian illustrating the hood in an actuated position.

Disclosed herein is an apparatus and method for releasing and moving a portion of a hood of a vehicle. Referring now to FIG. 1, a vehicle 10 is illustrated. Vehicle 10 has a hood 12, which is typically located at a forward portion of the vehicle. Also shown in FIG. 1 is a pedestrian 14. Unfortunately and in the event of a collision between the vehicle and the pedestrian the pedestrian may impact the hood of the vehicle. FIG. 2 illustrates the vehicle with the hood repositioned by a hood lift mechanism 15 in accordance with an exemplary embodiment of the present invention. In accordance with an exemplary embodiment of the present invention hood lift mechanism 15 is coupled to a controller 11, which is in electrical communication with a sensor 17 that is configured and positioned to detect or predict an impact with the pedestrian. If an impending impact is detected, an activation signal is sent to the controller for activation of the hood lift mechanism or alternatively the signal from the sensor is sent directly to the hood lift mechanism, wherein the hood is lifted (FIG. 2) prior to impact with the pedestrian.

In accordance with an exemplary embodiment, the sensor or sensor system of the vehicle may comprise an accelerometer or other equivalent device, in conjunction with a radar or distance sensing system in order to predict whether an impact is about to occur. In accordance with an exemplary embodiment controller 11 comprises a sensor or sensing-and-diagnostic module that is adapted to detect an activation event wherein the occurrence of a threshold event will cause an activation signal to be generated and received by the hood lift mechanism, thereby causing the rear portion of the hood to be lifted. The detection of the threshold event is determined by one or more sensors, which are disposed about the vehicle in accordance with known technologies. Some exemplary sensors may include impact sensors at the front as well as other locations of the vehicle as well as accelerometers to detect massive decelerations. Thus, the activation signal controls activation of the hood lift mechanism. In an exemplary embodiment, the sensing-and-diagnostic module comprises a microprocessor, microcontroller or other equivalent processing device capable of executing commands of computer readable data or program for executing a control algorithm that controls the operation of the hood lift mechanism. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

Accordingly, exemplary embodiments of the present invention provide a method and apparatus for providing a hood hinge having a disengagement/release function and the lift mechanism that raises the rear edge of the hood during the detection of a pre-determined activation event. This lifting of the rear edge of the hood will provide additional clearance between hard object located under the hood and the hood itself. Thus, portions of the hood are capable of being deflected, deformed, caved in, etc. upon impact with a pedestrian as they are moved away from hard objects beneath the hood.

Figures 3, 4:
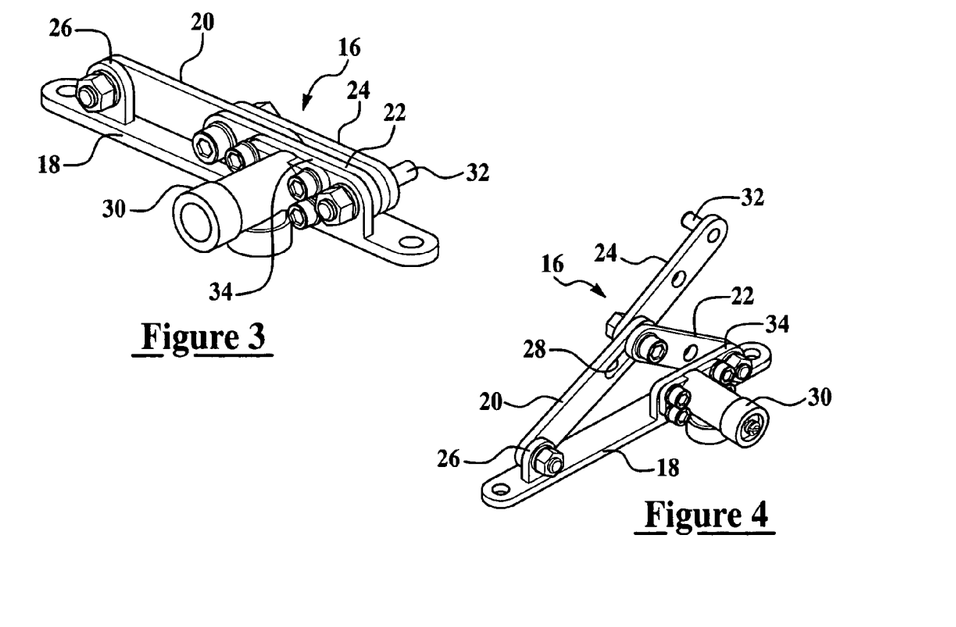
FIG. 3 is a perspective view of an exemplary embodiment of the present invention in a pre-activation position.
FIG. 4 is a perspective view of an exemplary embodiment of the present invention in a post activation position.
Figure 5:
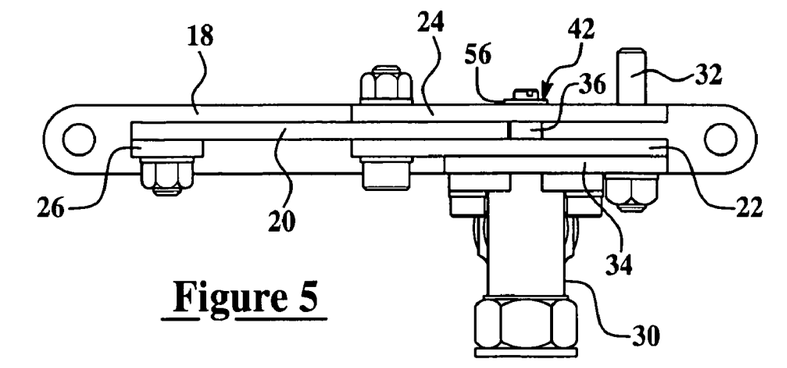
FIG. 5 is a top plan view of an exemplary embodiment of the present invention in a pre-activation position.
Figure 6A:
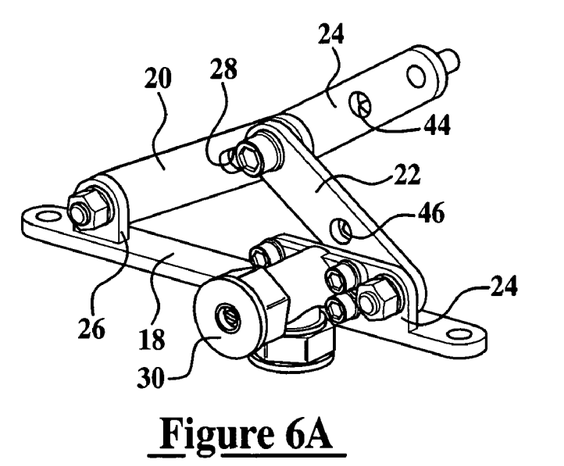
FIGS. 6A-6D are perspective views of an exemplary embodiment of the present invention in a post activation position.
Figure 6B:
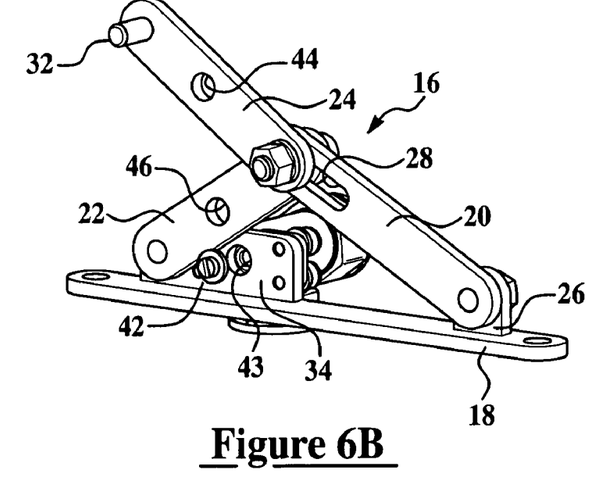
Figure 6C:
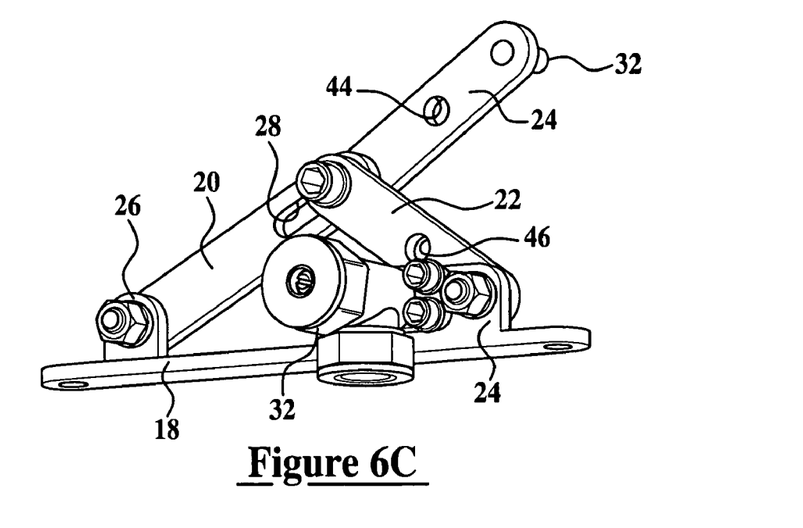
Figures 6D, 7:
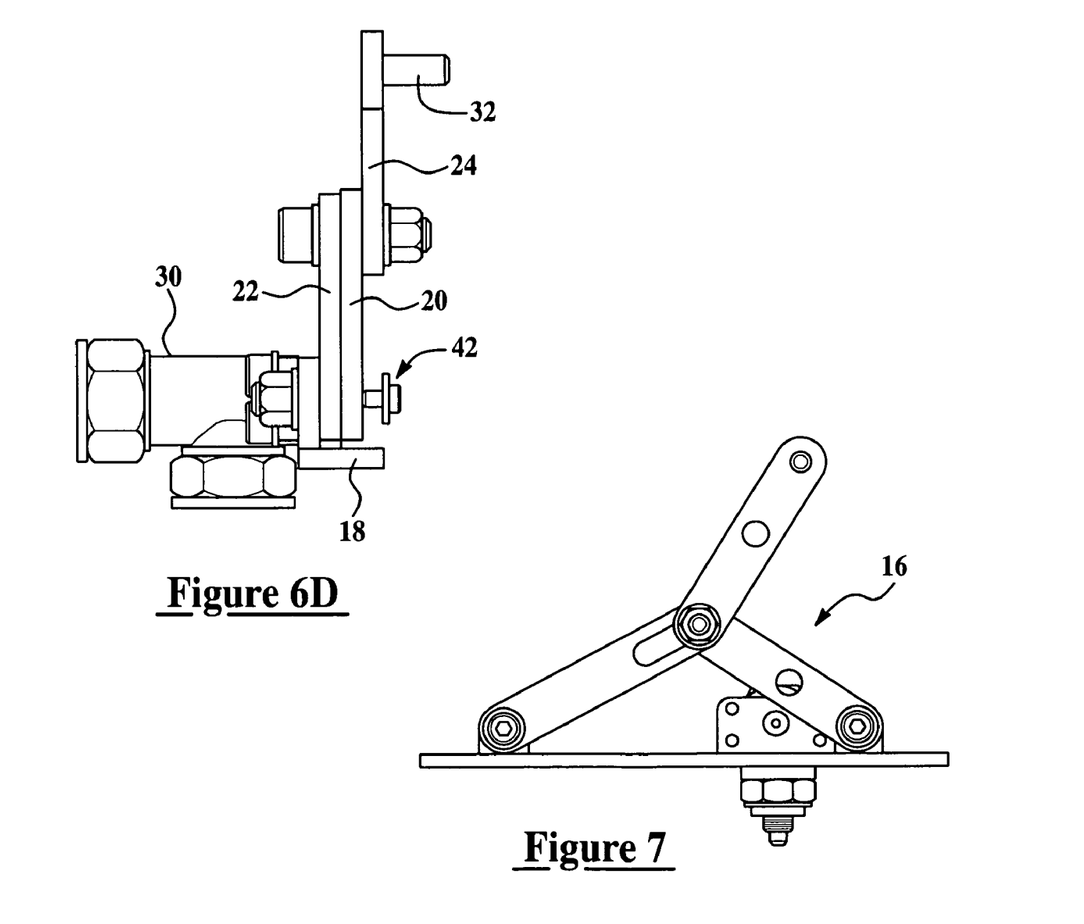
FIGS. 7-9 illustrate various positions of an exemplary embodiment of the present invention.

Referring now to FIGS. 3 and 4, a releasable hinge 16 for use with the hood lift mechanism of an exemplary embodiment of the present invention is illustrated. As illustrated, the releasable hinge comprises a base plate portion 18 having a first member 20 pivotally secured to the base portion at one end and a pair of members 22, 24 at the other end. In an exemplary embodiment base portion 18 is configured for securement to a portion of the vehicle. Alternatively, base portion 18 will comprise a portion of the vehicle frame. One of the pair of members 22 is pivotally secured to the base portion at an opposite end and the other one of the pair of members 24 is configured to be movably secured to the hood at its opposite end. In an exemplary embodiment member 20 is pivotally mounted to a flange portion 26 of base portion 18. In addition, and at the opposite end member 20 is configured to have an elongated opening 28, which as illustrated, facilitates the movement of the pair of members 22 and 24 with respect to member 20 when a release mechanism 30 of the device has been activated.

As illustrated in FIG. 3, the releasable hinge is shown in a pre-activation position, wherein the hood will pivot about a pivot member 32 of member 24 during normal non-activated operation of the hood. In this configuration, member 24 is prevented from pivoting with respect to the base portion and member 22. In accordance with an exemplary embodiment, member 24 is only released from this configuration when release mechanism 30 has been activated.

Referring now to FIGS. 3-11, and in the event of a collision with a pedestrian wherein an activation signal is received by the release mechanism, the release mechanism will release member 24 from its non-pivotal securement to the base portion. In accordance with an exemplary embodiment of the present invention, release mechanism 30 is a pyrotechnically activated device secured to a flange portion 34 of base portion 18. In addition, member 22 is also pivotally secured to flange portion 34. It is, of course, understood that member 22 and mechanism 30 may be secured to other portions of base portion 18 or alternatively base portion 18 may comprise a portion of the vehicle's structural components.

Figures 8, 9, 10A:
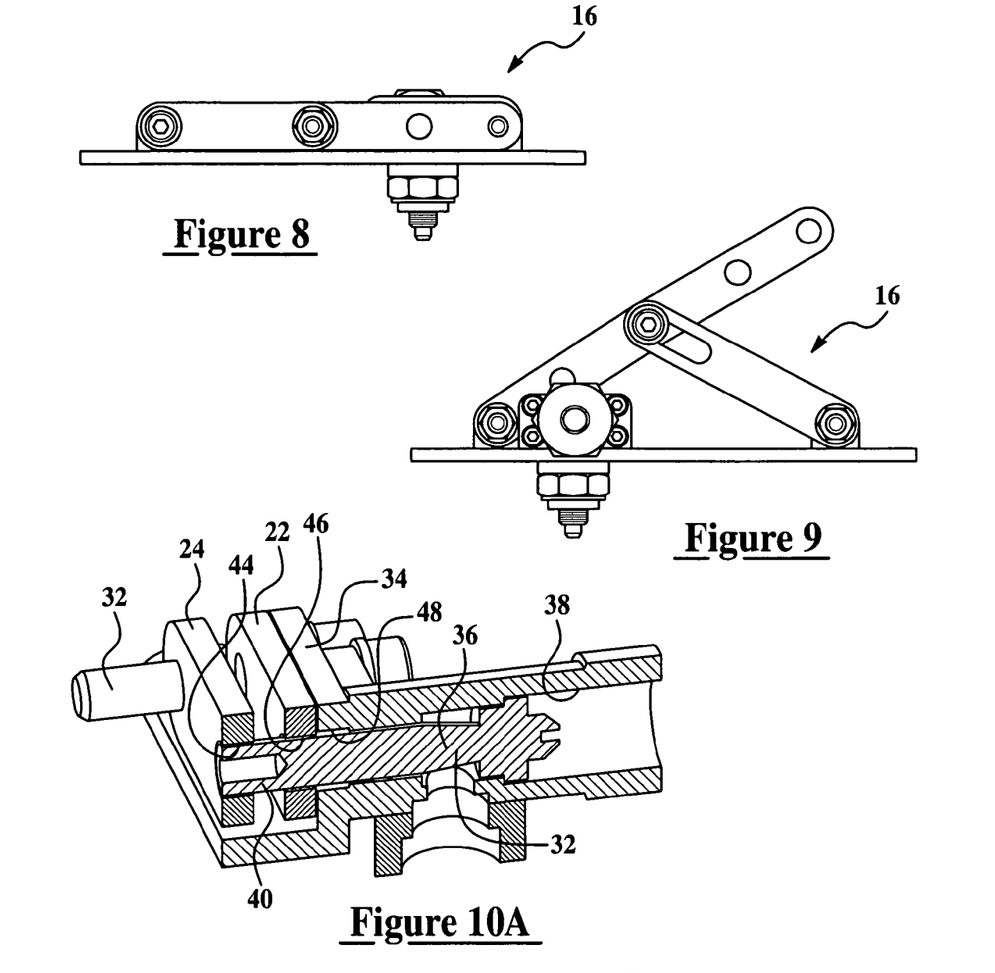
FIGS. 10A-10B are perspective cross sectional views of an exemplary embodiment of the present invention in a pre-activation position.
Figure 10B:
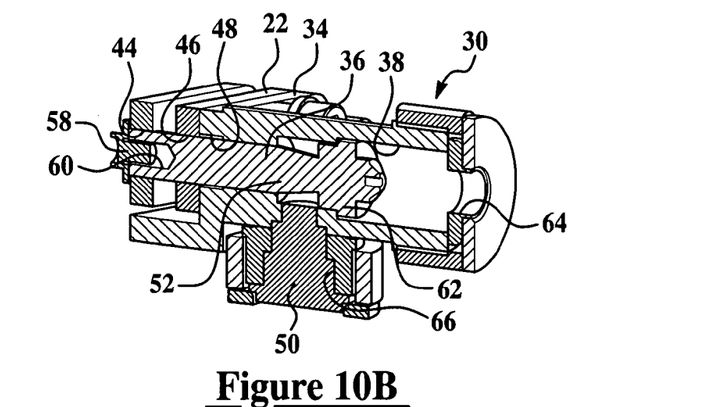
Figure 11:
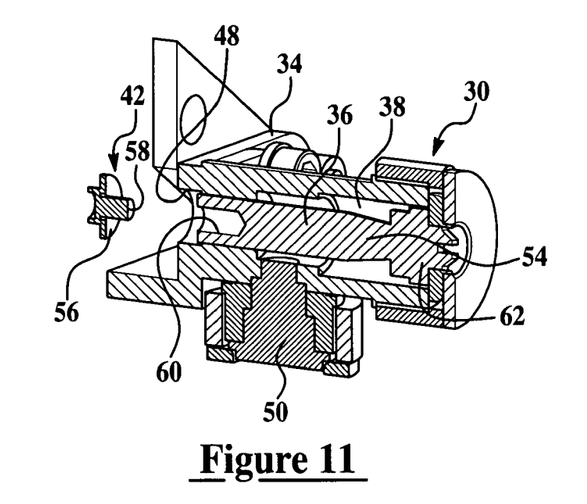
FIG. 11 is a perspective cross sectional view of an exemplary embodiment of the present invention in a post-activation position.
Figure 12:
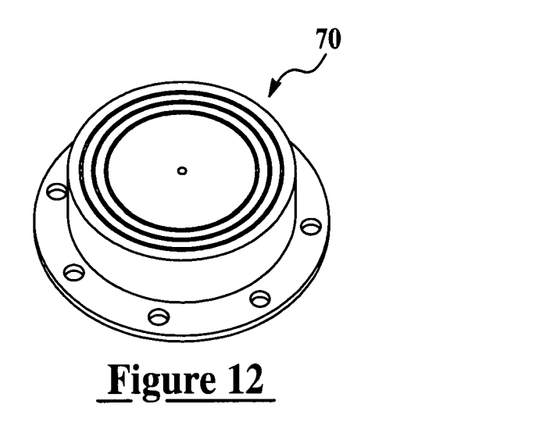
FIG. 12 is a perspective view of an actuating mechanism of an exemplary embodiment of the present invention in a pre-activation position.
Figure 13:
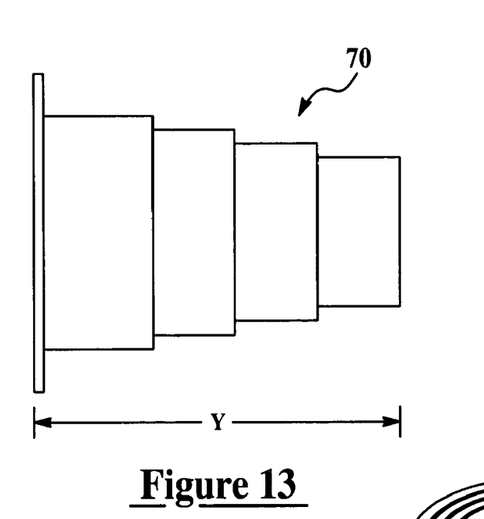
FIG. 13 is a side view of an actuating mechanism of an exemplary embodiment of the present invention in a post-activation position.
Figure 14:
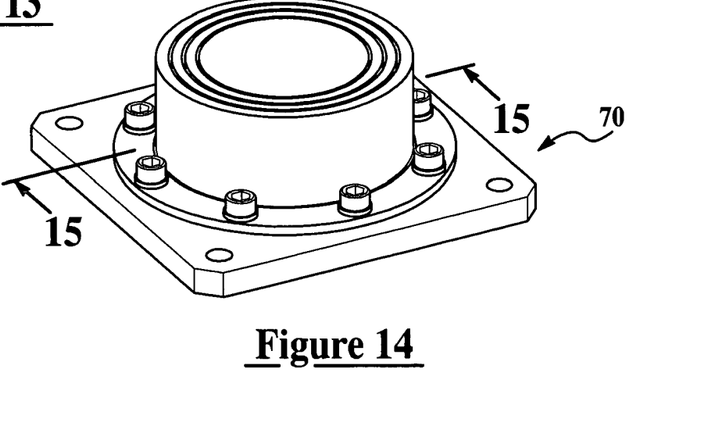
FIG. 14 is a perspective view of an actuating mechanism of an exemplary embodiment of the present invention in a pre-activation position.
Figure 15:
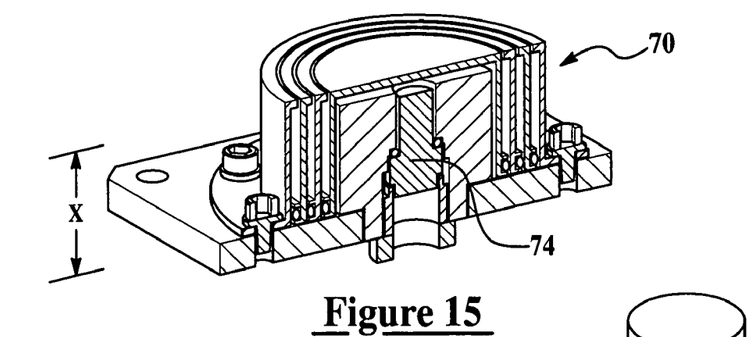
FIG. 15 is a view along lines 15-15 of FIG. 14.
Figure 16:
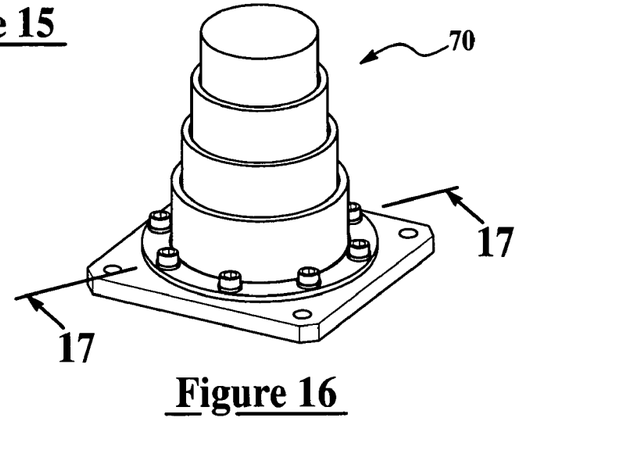
FIG. 16 is a perspective view of an actuating mechanism of an exemplary embodiment of the present invention in a post-activation position.
Figure 17:
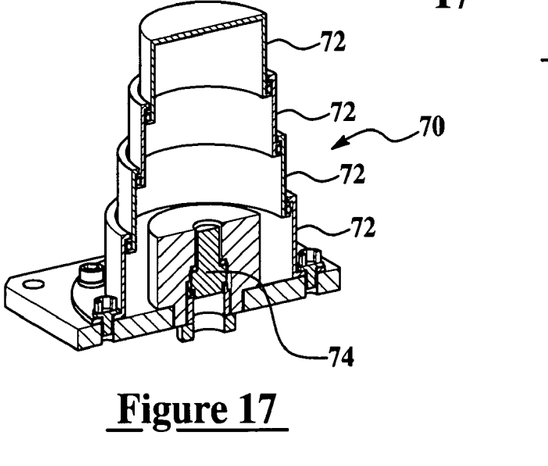
FIG. 17 is a view along lines 17-17 of FIG. 16.

As shown in FIGS. 10A-11 release mechanism 30 has a release bolt 36 slidably received within a passage 38 of mechanism 30. Release bolt 36 has an end portion 40 fixedly secured to member 24 by an activation indicator 42, wherein end portion 40 passes through an opening 44 in member 24, an opening 46 in member 22, and an opening 48 in flange portion 34. As will be discussed herein activation indicator 42 is releasably secured to end portion 40.

Thus, in this configuration release bolt 36 will prevent members 20, 22 and 24 from pivoting with respect to the base plate until activation of the release mechanism. Upon receipt of an activation signal from one of the vehicle sensors or the control module a pyrotechnic device or pyrotechnic squib 50 will fire providing an activation force to a central portion 52 of the release bolt. Central portion 52 is configured to facilitate movement of the release bolt in the direction of arrow 54. As release bolt 52 moves in the direction of arrow 54 end portion 40 slides out of openings 44, 46 and 48. This movement of release bolt 36 in passage 38 also causes activation indicator 42 to become dislodged from end portion 40 as activation indicator 42 has a flange portion 56 that is larger in size than opening 48. Activation indicator 42 further comprises a stud portion 58 that is releasably received with an opening 60 disposed in end portion 40. Stud portion 58 may be press fit into opening 60 in order to allow hinge 16 to be used as a conventional hood hinge. Alternatively, stud portion 58 may comprise a plurality of threads for engaging complimentary threads in opening 60, wherein the threads and stud portion 58 are formed from a plastic material that will give upon activation of pyrotechnic device 50. In addition to being releasably secured to release bolt 36, activation indicator will provide a means for determining whether device 50 has been activated. This is particularly useful in post accident investigations as after the collision the hinge mechanism may be in a different configuration than at the time of impact.

At its opposite end release bolt 52 has a forward portion 62 configured to have a portion received within an opening 64 of release mechanism 30 when the release bolt slides in the direction of arrow 54. This portion in one embodiment will provide a means for determining whether the device has been activated as well as providing a means for retaining the release bolt in the deployed position (FIG. 11). As illustrated in FIGS. 10A-11, pyrotechnic device 50 is received with an opening 66 that is in fluid communication with passage 38 so that the combustion forces of squib 50 are able act upon central portion 52 (e.g., pyrotechnic device 50 ignites and increases the pressure within passage 38 thus creating a force upon release bolt 52). In addition, and as illustrated central portion 52 is angularly configured or chamfered to assist in movement of the release bolt by squib 50 and forward end 62 is also configured to have a shoulder portion configured to engage a shoulder portion of passage 38. It is, of course, understood that the configuration of bolt 36 and passage 38 may vary from those illustrated in the Figures and the same are merely provided as non-limiting examples of one exemplary embodiment.

Referring now to FIGS. 12-17, a lift mechanism 70 for use with releasable hinge 16 is illustrated. As previously discussed, releasable hinge provides a means for releasing the hood from the vehicle structure so that the same can be displaced away from the vehicle prior to impact with a pedestrian. Accordingly, lift mechanism 70 provides the means to relocate or move a portion of the hood after the releasable hinge has been activated. The lift mechanism is configured to provide a lifting force to the hood when the release mechanism has been activated. In an exemplary embodiment, lift mechanism 70 comprises a plurality of telescoping members 72, which allow the vertical dimension of lift mechanism 70 to increase from an unexpanded height of "X" to an expanded height "Y". In accordance with an exemplary embodiment, an actuation device 74 is disposed within members 72. Actuation device 74 provides a force for expanding members 72 to the configuration illustrated in FIGS. 13, 16 and 17. In accordance with an exemplary embodiment, actuating device may be a compressed spring or a device or vessel holding a compressed gas wherein upon release of the spring or the compress gas will apply a force to one of the members in order to expand them into the configuration of FIGS. 13, 16 and 17. Alternatively, device 74 is a pyrotechnic device capable of providing such an actuating force. Other equivalent devices are also contemplated for providing the means for providing a force to members 72. In accordance with an exemplary embodiment an activation signal is provided to mechanism 70 from either the controller or directly from a sensor disposed on the vehicle, whereupon receipt of this signal will cause activation of device 74 to provide the necessary force to expand members 72 and move hood 12. In yet another alternative exemplary embodiment, a single device 71 (e.g., pyrotechnical, compressed gas, mechanical (compressed spring)) is configured to provide the necessary force to expand members 72 as well as slide release bolt in the direction of arrow 54. In this embodiment, the single device will receive an activation signal from a sensor disposed on the forward end of the vehicle, which determines if an impact with a pedestrian has or is about to occur. In this embodiment, the single device may be located within releasable hinge 16 or lift mechanism 70 or proximate to both, and in the case of pyrotechnically activated devices or compressed gas devices a single conduit 73 provides fluid communication between the chambers of lift mechanism 70 and releasable hinge 16 in order to release the hinge and lift the portion of the hood from the vehicle via a single device. A non-limiting example of such a conduit is illustrated by the dashed lines in FIG. 19. In yet another alternative exemplary embodiment, and in the case of mechanical devices for manipulation of lift mechanism 70 and releasable hinge 16 a pair of compressed springs may be located in lift mechanism 70 and releasable hinge 16 wherein a single cable travels through conduit 73 for manipulation of the mechanical devices in order to allow the compressed springs to expand lift mechanism 70 and slide the release bolt within passage 38.

Figure 18:
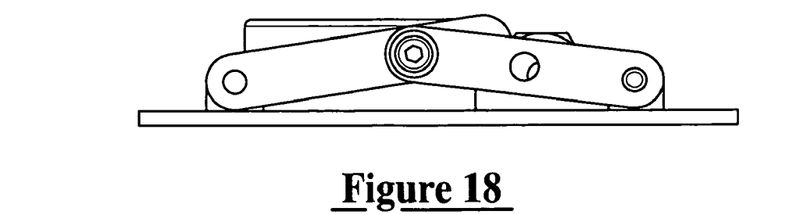
FIGS. 18-20 are perspective views of an exemplary embodiment of the present invention.
Figure 19:
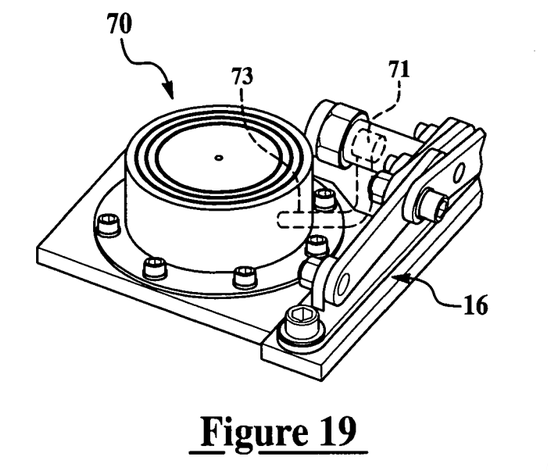
Figure 20:
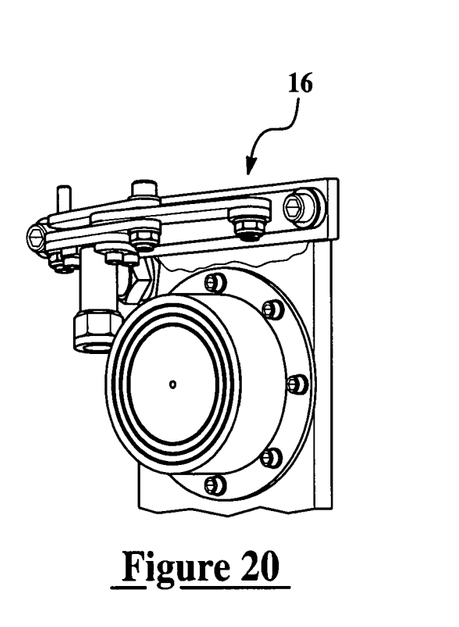

In accordance with an exemplary embodiment, lift mechanism 70 and release hinge 16 are used together to provide the desired movement of the hood when sensors in the vehicle have detected a predetermined activation event. As illustrated in FIGS. 18-19, lift mechanism is positioned proximate to release hinge 16. Accordingly, and upon receipt of an activation signal from a sensor or a control module linked to a sensor, devices 50 and 74 are activated or a single device 71 is activated wherein lift mechanism expands to make contact with a portion of the hood proximate to the release hinge and release hinge 16 is released so that it can expand to the configurations illustrated in FIGS. 4, 6A, 6B and 6C thereby allowing the rearward portion of the hood to be displaced from the vehicle (FIG. 2) in order to provide an unoccupied area between the bottom of the hood and objects in the engine compartment so that portions of the hood will be able to deform or cave in upon impact with a pedestrian.

In accordance with an exemplary embodiment, the releasable hinge could potentially be resettable, wherein after activation, the hood is re-connectable to its normal operation. This reconnection could occur at an authorized dealership of mechanic.

In accordance with an exemplary embodiment, a pair of releasable hinges are provides and at least one lifting mechanism is provided to displace the hood away from the vehicle.

In addition, the releasable hinges of exemplary embodiments of the present invention may comprise a portion of the energy absorption system of the hood. In this embodiment and upon impact, the hinges and/or the lift mechanism are capable of moving downwardly upon impact with an object on the hood. In fact, the lift mechanism or releasable hinge is capable of being provided with a resistance force that needs to be overcome in order for the lift mechanism or hood to be displaced back towards the vehicle. Thus, the release mechanism after being deployed may provide a ride down effect after impact with the pedestrian.

The upward motion of rearward edge of the hood may be controlled if contact occurs prior to full deployment. It should be noted that the requirements (timing and clearance) may be adaptable depending on the vehicle geometry, impact speed, size of the occupant, etc detected by the sensor. An example of a sensing control system is found in U.S. Pat. No. 6,520,276, the contents of which are incorporated herein by reference thereto.

Figure 21:
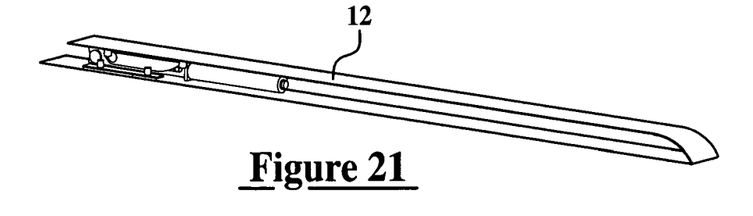
FIGS. 21-23 are perspective views of an alternative exemplary embodiment of the present invention.
Figure 22:
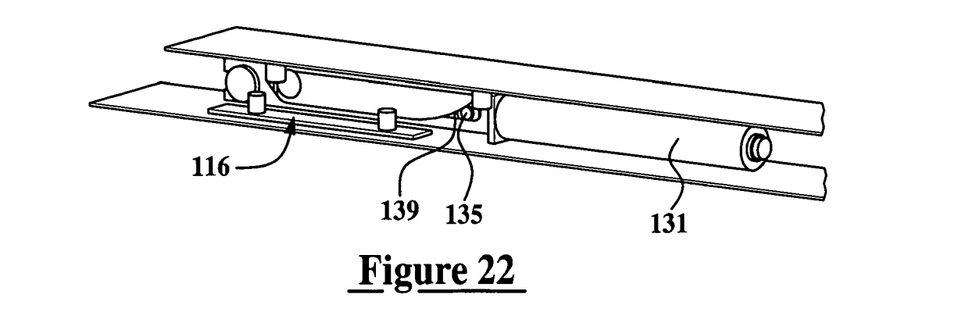
Figure 23:
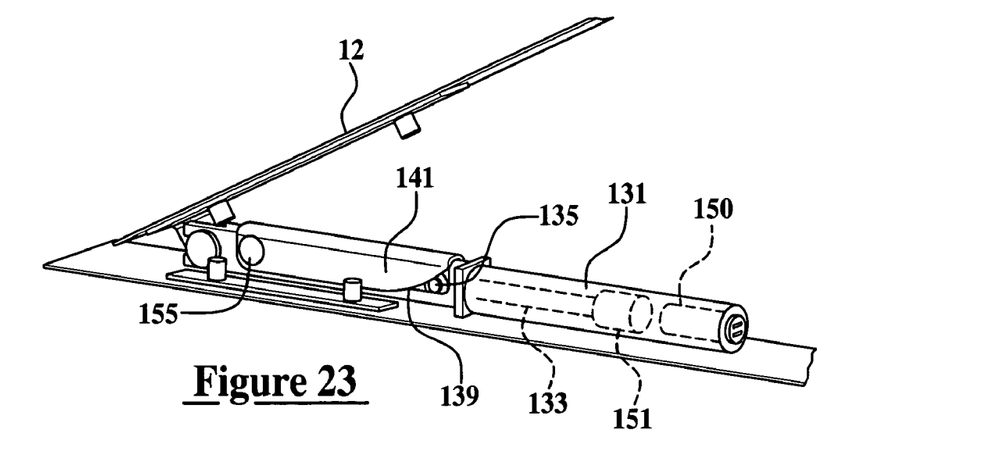

Referring now to FIGS. 21-29B alternative exemplary embodiments of the present invention are illustrated. In these figures only a portion of the hood is illustrated. Referring now to FIGS. 21 and 25B, a portion or slice of a hood is shown. Here hood 12 is pivotally secured to the vehicle by a release hinge 116. In this embodiment, hood 12 comprises a pivotal member 117, which during normal operation is pivotally secured to hinge 116. As illustrated, hinge 116 comprises a first member 119 fixedly secured to the vehicle. First member 119 has an upwardly facing opening 121 for rotatably receiving a portion 123 of pivot member 117 therein. In accordance with an exemplary embodiment, a portion of first member 119 is slidably received within a second member 125 or in other words second member 125 is slidably mounted first member (e.g., first member 119 is fixed to the vehicle).

Figure 24A:
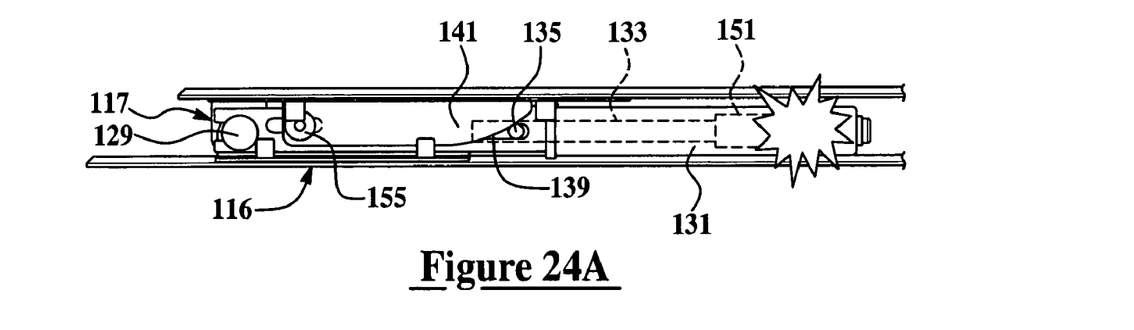
FIGS. 24A and 24B are side views of an alternative exemplary embodiment of the present invention.
Figure 24B:
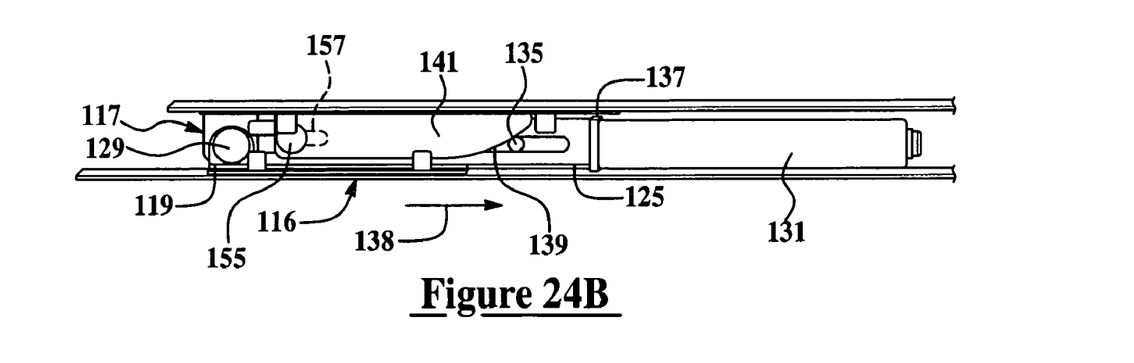
Figure 25A:
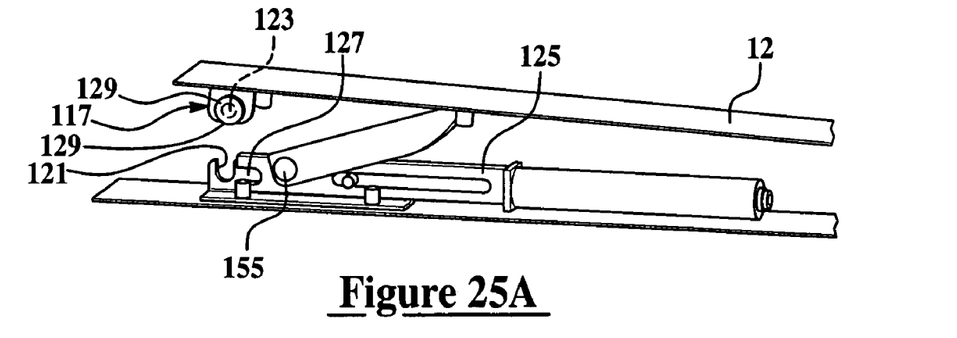
FIGS. 25A and 25B are perspective views of an alternative exemplary embodiment of the present invention.
Figure 25B:
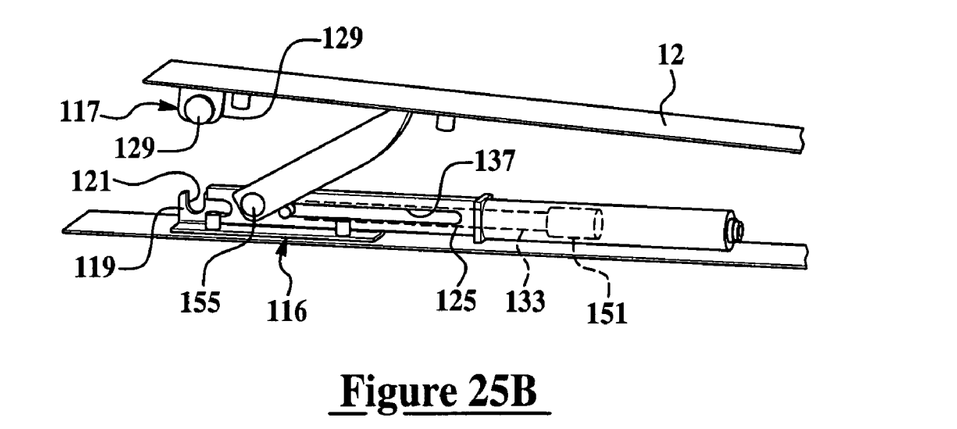
Figure 26:
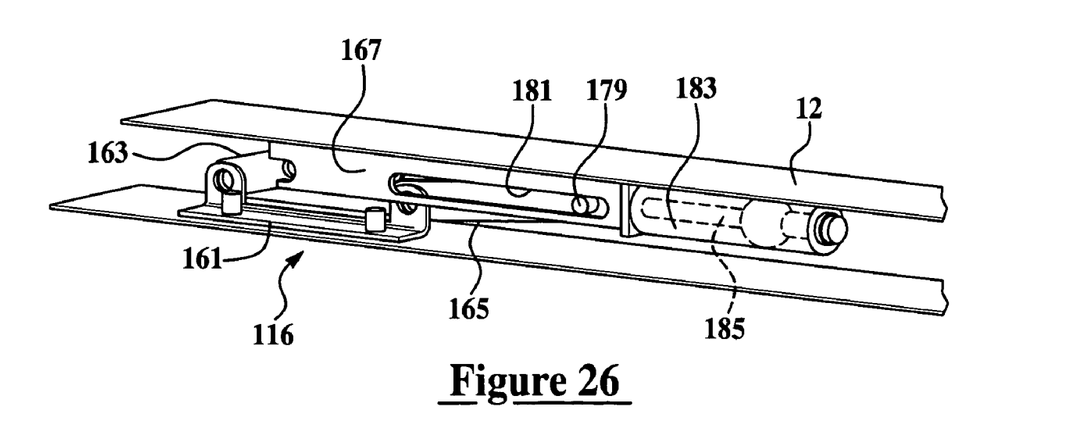
Figure 27:
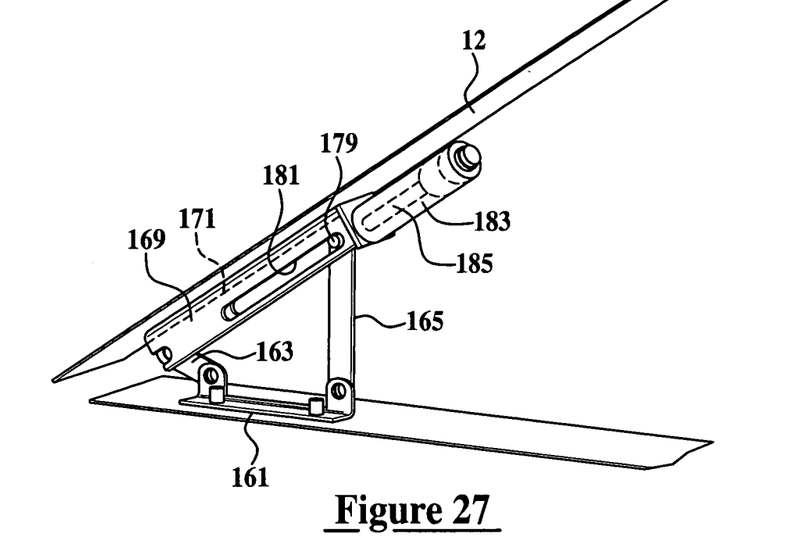

As illustrated in the Figures, second member 125 is configured for movement between a first position or non-actuated position (FIGS. 21, 22, 23 and 24A) and a second position or activated position (FIGS. 24B, 25A and 25B). A portion of second member 125 that is slidably mounted to first member 119 is configured to have a side or horizontally facing opening 127, which once positioned in the first position creates a means for pivotally securing portion 123 in openings 121 and 127 (e.g., openings 121 and 127 rotatably receive portion 123 therein). Although openings 121 and 127 are illustrated as side (horizontal) and upward vertical openings it is understood that exemplary embodiments of the present invention are intended to contemplate openings of any configuration as long as portion 123 is rotatably retained therein when second member 125 is in the first position and portion 123 is capable of being lifted out of opening 127 when second member 125 is in the second position. In addition, and as an alternative exemplary embodiment, second member 125 is configured to have a pair of openings 127 disposed on either side of opening 121 (e.g., second member 125 is configured to wrap around and slide about first member 119).

In one exemplary embodiment pivotal member 117 comprises larger end pieces 129 disposed on either side of portion 123. End pieces 129 are larger than the width of openings 121 and 127. Accordingly, end pieces 129 retain portion 123 within openings 121 and 127 while the same are aligned with each other and about portion 123.

Releasable hinge 116 further comprises an actuation device 131, which upon receipt of an activation signal from a controller or other equivalent device provides an activation force to an actuating member 133. In an exemplary embodiment, actuation device 131 is a pyrotechnically activated device or equivalent thereof (e.g., compressed gas device that is rupturable upon receipt of an activation signal) that is capable of providing a suitable driving force to a piston or other equivalent device for facilitating the required movement of the components of releasable hinge 116. In an exemplary embodiment, actuating member 133 is slidably mounted to second member 125. Actuating member 133 further comprises and actuating pin 135. Actuating pin 135 is slidably received within an elongated opening 137 of second member 125. During activation, actuating member 133 is slid from a non-activated position (FIGS. 22, 23 and 24A) toward an activated position (FIGS. 24B, 25A and 25B). During this movement actuating pin 135 makes contact with a cam surface 139 of a lift lever 141. Lift lever 141 is pivotally secured to the releasable hinge so that the portion of the lift lever comprising the cam surface is able to move away from the releasable hinge. Accordingly, and upon firing of actuating device 131 a force is applied to actuating member 133 so that actuating pin 135 makes contact with the cam surface so that the lift lever is pivoted away from the releasable hinge.

In addition, the firing of the actuation device 131 causes second member 125 to move with respect to first member 119 thereby causing portion 123 to no longer be retained within openings 121 and 127. As illustrated in FIG. 24B, this is caused by the retracting or sliding second member 125 in the direction of arrow 138 prior to pin 135 acting upon the cam surface of lift lever 141. Thus, and after firing of the actuation device 131, second member 125 will first slid to the right so that portion 123 will no longer be retained within openings 121 and 127 and thereafter the pivotal movement of lift lever 141 with respect to the releasable hinge will cause a portion of the hood to be moved away from the vehicle. It being understood that second member 125 will retract or be moved to the activated position (FIGS. 24B, 25A and 25B) prior to pivotal movement of lift lever 141 that causes upward movement of the hood, wherein movement of member 125 is facilitated by the activation of activation device 131. In addition, members 119 and 125 are configured to ensure such movement. In accordance with an exemplary embodiment, actuation device 131 comprises a pyrotechnically activated squib 150 located within a chamber defined by a housing of device 131 secured to second member 125 and a portion of actuating member 133 is slidably received within the chamber of device 131 such that upon receipt of an activation signal from one of the vehicle sensors or the control module the pyrotechnic device or pyrotechnic squib 150 will fire and provide a force upon a portion of actuation member 133 in order to facilitate movement of the same. One non-limiting example of such an actuating member would comprise a piston 151 disposed in a circular chamber defined by housing 131 wherein the combustion force of squib 150 would act on one end of the piston to move it in the chamber and the other end of the piston would be coupled to member 133 in order to facilitate the desired movement. Thus, firing of the squib will first cause second member to move to the position wherein openings 121 and 127 are no longer aligned and thereafter the lift lever 141 will pivot upward as pin 135 slides within opening 139.

In addition, and as illustrated in FIGS. 24A and 24B, lift lever 141 is pivotally secured to the first member and the second member by a pivot pin 155, which has a shaft portion rotatably received within an elongated opening 157 of second member 125 and an opening of first member 119 (not shown). Elongated opening 157 is configured to allow the movement of second member in the direction of arrow 138 prior to the lifting of the hood by lift lever 141. In addition, and in yet another alternative exemplary embodiment, lift lever 141 is configured to wrap around second member 125 to provide a pair of cam surfaces on either side of second member 125 wherein pin 135 is long enough to make contact with both of the cam surfaces as pin 135 travels through opening 137.

Referring now to FIGS. 26-29B another alternative exemplary embodiment of the present invention is illustrated. Here releasable hinge 116 comprises a first portion 161 fixedly secured to a portion of the vehicle. The releasable hinge of this embodiment comprises a first connecting member 163 and a second connecting member 165. First connecting member 163 is pivotally secured to first portion 161 at one end and a second portion 167 at another end. Second portion 167 is secured to the underside of the hood. One non-limiting example of the pivotal securement of first connecting member 163 to first portion 161 is a bolt or other connection device (not shown for purposes of clarity) passing through complementary openings in first portion 161 and first connecting member 163. Of course, other means for pivotal securement are contemplated to be within the scope of the present invention.

Second portion 167 comprises a fixed portion 169 and a slidable portion 171. Similarly to the previous embodiment, fixed portion 169 has a horizontally or sidewardly faced opening 173 and slidable portion 171 comprises a downwardly faced opening 175, which in combination with horizontally faced opening 173 provides a means for rotatably securing a portion of the securement member that passes through an opening 177 of first connecting member 163 in order to provide pivotal movement of the hood with respect to the releasable hinge when the same is in a non-actuated position. In an alternative exemplary embodiment fixed portion 169 is configured to a pair of openings 173 disposed on either side of opening 175 (e.g., fixed portion 169 wraps around slidable portion 171 and slidable portion 171 is slidably received therein).

Figure 28A:
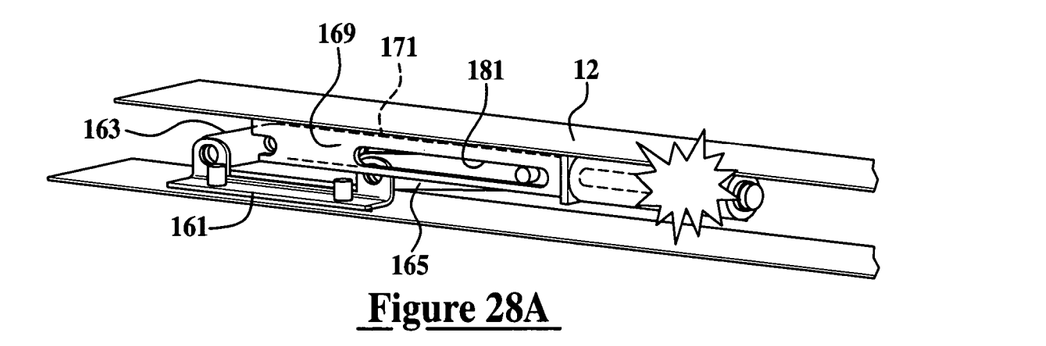
Figure 28B:
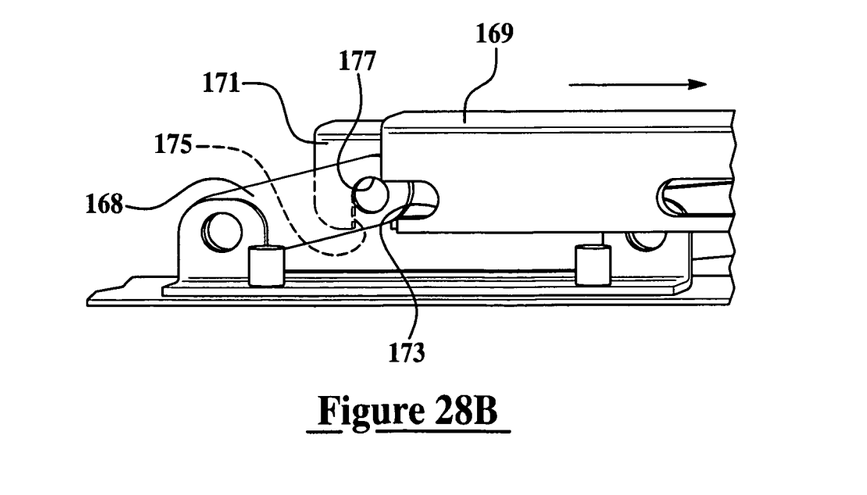
Figure 29A:
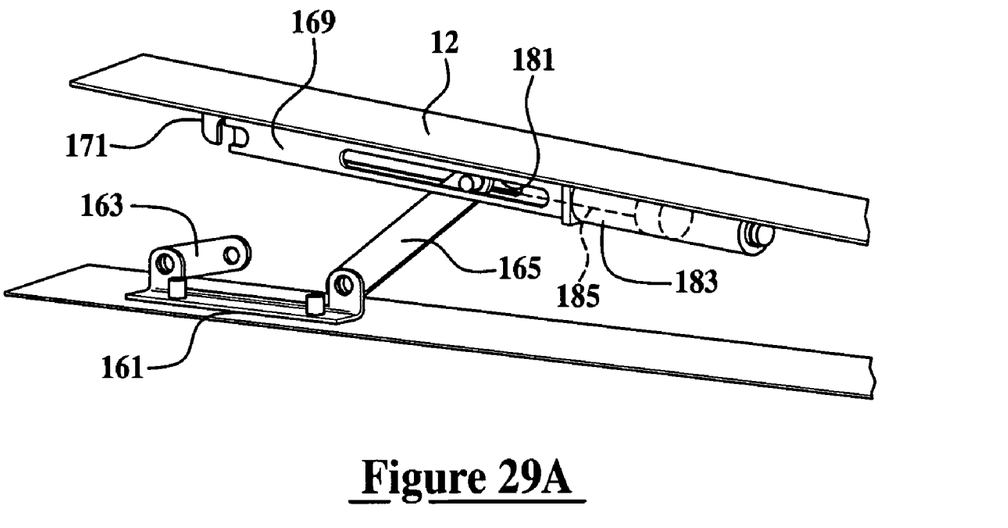
Figure 29B:
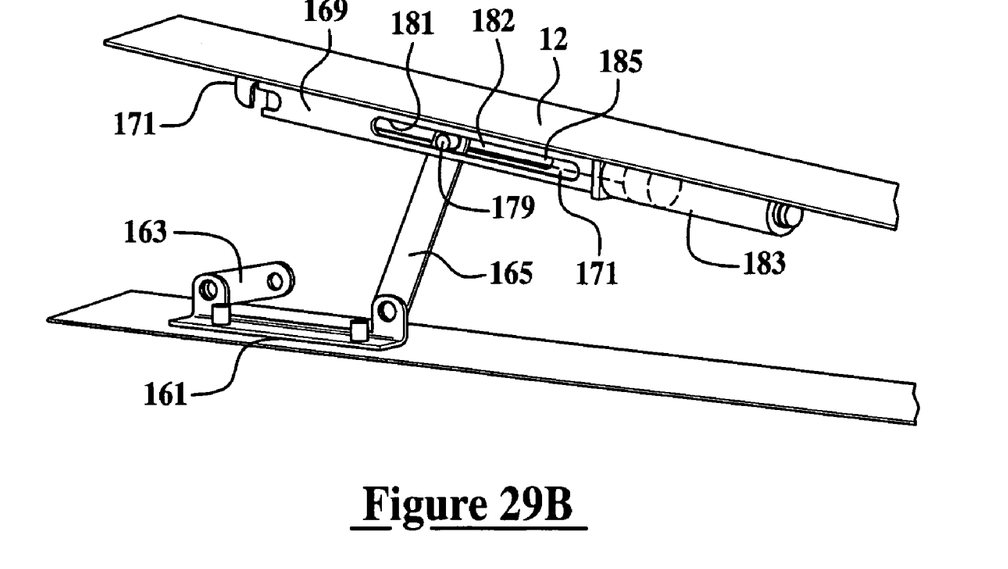

Second connecting member 165 is also pivotally secured to first portion 161 in a similar fashion as first connecting member 163 (e.g., bolts, pins, rivets, etc. (not shown), passing through openings in member 165 and first portion 161). At its opposite end second connecting member 165 has an actuating pin 179 slidably received within an elongated opening 181 of fixed portion 169 and an elongated opening 182 of slidable portion 171. During activation of an actuating device 183, an actuating force is applied to slidable portion 171 causing the same to move with respect to fixed portion 169 thereby misaligning openings 173 and 175, which will allow first connecting member 163 to no longer be pivotally secured to the hood. This positioning is illustrated in FIG. 28B. In addition and during activation of actuating device 183, an actuating member 185 slidably received within device 183 applies a force to actuating pin 179 causing the same to travel within elongated openings 181 and 182 thereby causing the rearward end of hood 12 to be displaced from the vehicle. This is due to the first connecting member 163 no longer being secured to the hood and second connecting member 165 has a longer length, which causes the hood to be displaced as the actuating pin of the same is slid within elongated opening 181. In one exemplary embodiment, pin 179 is secured to member 185, which is a rod member comprising a piston received within device 183. Again, it is understood that portions 169 and 171 are misaligned prior to movement of actuating pin 179 within opening 181 that will cause connecting member 165 to move the hood away from the vehicle. Thus, the force of the actuating device 183 will first cause misalignment of portions 169 and 171 as the hood will not be capable of movement upward until the pivot pin of the hood is released.

As in the previous embodiments actuating device 183 may be a compressed spring or a device or vessel holding a compressed gas wherein upon release of the spring or the compress gas will apply a force to actuating member 185. Alternatively, device 183 is a pyrotechnic device capable of providing such an actuating force. Other equivalent devices are also contemplated for providing the means for providing a force to facilitate movement of the actuating member. In accordance with an exemplary embodiment an activation signal is provided to actuating device 183 from either the controller or directly from a sensor disposed on the vehicle, whereupon receipt of this signal will cause activation of device 183 in order to provide the necessary force to member 185.

Alternatively, and as application configurations allow, portion 169 may be slidably received within portion 171 which is fixedly secured to the hood or in yet another alternative exemplary embodiment both portions 169 and 171 may be configured to provide slidable movement with respect to each other. In addition and upon activation of actuating device 183, portions 169 and 171 are configured to facilitate misalignment (e.g., release of the hood) prior to movement of actuating pin 179 within opening 181 that will cause the hood to move away from the vehicle.

Accordingly, exemplary embodiments of the present invention are intended to provide a means for elevating a portion of the hood prior to contact. In exemplary embodiments of the present invention, the hood is elevated through a pyrotechnically activated hinge release mechanism and lift actuator which will allow the hood to deform and absorb impact energy before bottoming out on under hood hard objects such as engine etc.

Operation of exemplary embodiments of the present invention are contemplated as follows, during normal (no-crash) operations, the hood is in its normal position. The releasable hinges remain engaged with the vehicle structure through the use of a pin/bolt. At occupant contact with the front bumper, a signal is transmitted by the detection sensor to the controller which then activates a pyrotechnic device. This device is then used to push the pin/bolt out which will disengage the hood along with the hinges from the vehicle structure connection and results in releasing of the hinge. Once the hinges are released, the hood is lifted upwards at the rear edge through a lift mechanism or a lift mechanism that comprises a portion of the releasable hinge. The motion is assisted through a telescoping spring release system and/or compressed gas or a pyrotechnic lift mechanism. It should be noted that the upward motion can be stopped/reduced once resistance is encountered due to occupant contact.

In addition, and as an alternative exemplary embodiment, an airbag can be used under the hood or can be deployed between the hood inner and outer surfaces.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A releasable hinge for securing a hood to a vehicle, the releasable hinge comprising:
    a base portion;
    a first member pivotally secured to the base portion at one end and having an other end;
    a second member having one end pivotally secured to the other end of the first member and having an other end pivotally secured to the base portion, said second member having an opening apart from the ends;
    a third member having one end pivotally secured to the other end of the first member and having an other end configured to be pivotally secured to the hood, said third member having an opening apart from the ends and aligned with the opening in the second member; and
    a release mechanism for releasably securing the first member, the second member, the third member and the base portion in a first position wherein the first, second and third members are adjacent the base portion, said release mechanism being mounted to said base portion and comprising a release bolt slideably received in the openings of the second and third members and removable from the openings to release the members, whereupon the members are able to pivot from the first position to a second position wherein the other end of the third member is spaced apart from the base portion to allow the hood to move apart from the base portion.

2. The releasable hinge as in claim 1, wherein the release mechanism farther comprises a pyrotechnically activated device for providing an activation force to remove the release bolt from the openings.

3. The releasable hinge as in claim 2, wherein the release mechanism further comprises an activation indicator that becomes dislodged from the releasable hinge upon activation of the release mechanism.

4. The releasable hinge as in claim 1, wherein the first member comprises an elongated opening at the other end, and wherein the releasable hinge further comprises a bolt extending through the elongated opening and pivotally securing the one end of the second member and the one end of the third member.

5. An activation system for a hood of a vehicle, the activation system comprising:
    a pair of releasable hinges for pivotally securing the hood to the vehicle, each hinge of the pair of releasable hinges comprising:
        a base portion;
        a first member pivotally secured to the base portion at one end and having an other end;
        a second member having one end pivotally secured to the other end of the first member and having an other end pivotally secured to the base portion, said second member having an opening apart from the ends;
        a third member having one end pivotally secured to the other end of the first member and having an other end configured to be pivotally secured to the hood, said third member having an opening apart from the ends and aligned with the opening in the second member; and
        a release mechanism for releasably securing the first member, the second member, the third member and the base portion in a first position wherein the first, second and third members are adjacent the base portion, said release mechanism being mounted to said base portion and comprising a release bolt slideably received in the openings of the second and third members and removable from the openings to release the members, whereupon the members are able to pivot from the first position to a second position wherein the other end of the third member is spaced apart from the base portion to allow the hood to move apart from the base portion; and
    a lift mechanism for providing a lifting force to the hood, wherein activation of the lift mechanism moves a portion of the hood away from the vehicle when the release mechanism has been activated.

6. The activation system as in claim 5, wherein the lift mechanism comprises a plurality of telescoping members.

7. The activation system as in claim 6, wherein the release mechanism further comprises a pyrotechnically activated device for providing an activation force to remove the release bolt from the openings.

8. The activation system as in claim 7, wherein the pyrotechnically activated device also provides an activation force to the plurality of telescoping members of the lift mechanism.

9. The activation system as in claim 7, wherein the release mechanism further comprises an activation indicator that becomes dislodged from the releasable hinge upon activation of the release mechanism.

* * * * *